US009634780B2

(12) United States Patent
Mungall et al.

(10) Patent No.: US 9,634,780 B2
(45) Date of Patent: Apr. 25, 2017

(54) POWERLINE INTERFERENCE INDICATION AND MITIGATION FOR DSL TRANSCEIVERS

(71) Applicant: Metanoia Communications Inc., Hsinchu (TW)

(72) Inventors: Sam Mungall, Hsinchu (TW); Ravi Mantri, Portland, OR (US)

(73) Assignee: METANOIA COMMUNICATIONS INC., Hsinchu (TW)

( * ) Notice: Subject to any disclaimer, the term of this patent is extended or adjusted under 35 U.S.C. 154(b) by 356 days.

(21) Appl. No.: 14/253,018

(22) Filed: Apr. 15, 2014

(65) Prior Publication Data

US 2014/0307572 A1 Oct. 16, 2014

Related U.S. Application Data

(60) Provisional application No. 61/812,702, filed on Apr. 16, 2013.

(51) Int. Cl.
*H04J 3/02* (2006.01)
*H04J 3/14* (2006.01)
*H04L 12/24* (2006.01)
*H04J 3/16* (2006.01)
*H04B 3/32* (2006.01)
*H04M 11/06* (2006.01)

(52) U.S. Cl.
CPC ............... *H04J 3/025* (2013.01); *H04B 3/32* (2013.01); *H04J 3/14* (2013.01); *H04J 3/1694* (2013.01); *H04L 41/12* (2013.01); *H04M 11/062* (2013.01); *H04B 2203/5408* (2013.01)

(58) Field of Classification Search
CPC . H04J 3/025; H04J 3/14; H04J 3/1694; H04L 41/12; H04L 1/0001; H04M 3/34; H04M 11/062; H04B 3/32; H04B 2203/5408
See application file for complete search history.

(56) References Cited

U.S. PATENT DOCUMENTS

| 2012/0026908 A1* | 2/2012 | Tzannes | H04L 41/12 370/252 |
| 2012/0087229 A1* | 4/2012 | Mantri | H04W 28/18 370/201 |
| 2013/0325965 A1* | 12/2013 | Egan | H04L 65/403 709/204 |

* cited by examiner

*Primary Examiner* — Jae Y Lee
(74) *Attorney, Agent, or Firm* — Han IP Corporation; Andy M. Han

(57) ABSTRACT

The present disclosure outlines mechanisms, systems, methods, techniques and algorithms that gateway devices and powerline communication (PLC) networks can follow to mitigate adverse effects from the aforementioned inter-network interference. Although the present disclosure provides implementation details for G.hn and VDSL2, the mechanisms, systems, methods, techniques and algorithms described herein are equally applicable to other similar technologies. Therefore, when referring to non-implementation specific systems, methods, techniques and algorithms the term PLC is used to refer to a powerline network and the term customer premises equipment (CPE) is used to refer to a home-gateway device.

36 Claims, 5 Drawing Sheets

POWERLINE INTERFERENCE INDICATION AND MITIGATION FOR DSL TRANSCEIVERS

CROSS REFERENCE TO RELATED PATENT APPLICATION

The present disclosure is a non-provisional application claiming the priority benefit of U.S. Provisional Patent Application No. 61/812,702, filed on 16 Apr. 2013, which is incorporated by reference in its entirety.

TECHNICAL FIELD

The present disclosure generally relates to the field of digital communication and, more particularly, to broadband communications in the home networking environment.

BACKGROUND

Standard cabling used for broadband telecommunications is designed in such a way as to minimize electromagnetic interference from the signals generated by the transceivers, such as using shielding and/or balanced pairs. G.hn and other powerline communication (PLC) based devices, such as HomePlug and Institute of Electrical and Electronics Engineers (IEEE) 1901, operate by transmitting broadband signals over in-house powerline wiring, which may not be designed for data communications. As a result, excessive electromagnetic (EM) emissions from the wiring when the devices are operating may occur. These excessive emissions can cause interference in other mediums in the vicinity and affect the performance of the devices operating over those mediums.

PLC is becoming a popular choice for operators to interconnect multiple devices within customers' premises to each other and to the home-gateway wide-area network. There are some home-gateway technologies such as very-high-bit-rate digital subscriber line 2 (VDSL2) and G.fast that rely on broadband communication that share the same spectrum as the in-house PLC network. FIG. 1 is a diagram showing typical PLC-to-CPE interference, where a PLC network includes a domain master (DM) and a number of network nodes such as Node 1 and Node 2. As shown in FIG. 1, despite operation on separate wiring, the topology of the home-gateway access wiring and the in-house wiring may be such that there may be a high degree of EM coupling between the networks, resulting in inter-network interference caused by the PLC network and suffered by a customer premises equipment (CPE) device on a different network which may implement a technology different than the PLC technology, e.g., Ethernet, Cable or digital subscriber line (DSL). The transmission on one wiring will cause signals to leak into and appear as noise on the other wiring in the vicinity to result in interference, instability and errors.

SUMMARY

The present disclosure outlines mechanisms, systems, methods, techniques and algorithms that gateway devices and PLC networks can implement in order to mitigate adverse effects from the aforementioned inter-network interference. Although the present disclosure provides implementation details for G.hn and VDSL2, the mechanisms, systems, methods, techniques and algorithms described herein are equally applicable to other similar technologies. Therefore, hereinafter in the present disclosure, the term PLC is used to refer to a powerline communication network and the term CPE device is used to refer to a home-gateway device.

In one aspect, a communication system may include a first transceiver system implementing a first technology and a second transceiver system implementing a second technology. The first technology, as an interfering technology, may cause interference on the second technology, as a victim technology, such that the interfering technology has a transmission mode that allows the victim technology to adapt to the interference.

In another aspect, a method may include one or more processors of a CPE device sending a first request message to a DM of a network having a plurality of network nodes. The first request message may indicate at least one network node of the plurality of network nodes is requested to enter a forced probe transmission (FPT) mode. The first request message may also indicate a predefined duration during which the indicated at least one network node of the plurality of network nodes is requested to transmit a probe frame when in the FPT mode. The method may also include the one or more processors of the CPE device measuring one or more parameters related to a signal transmission channel during a time when the at least one network node of the plurality of network nodes is in the FPT mode.

In still another aspect, a method may include one or more processors of a DM of a network having a plurality of network nodes receiving a first request message from a CPE device. The first request message may indicate at least one network node of the plurality of network nodes requested to enter a FPT mode. The first request message may also indicate a predefined duration during which the indicated at least one network node of the plurality of network nodes is requested to transmit a probe frame when in the FPT mode. The method may also include the one or more processors of the DM sending an acknowledgement to the CPE device in response to receiving the first request message.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure.

DETAILED DESCRIPTION OF PREFERRED EMBODIMENTS

Overview

Figure 1:
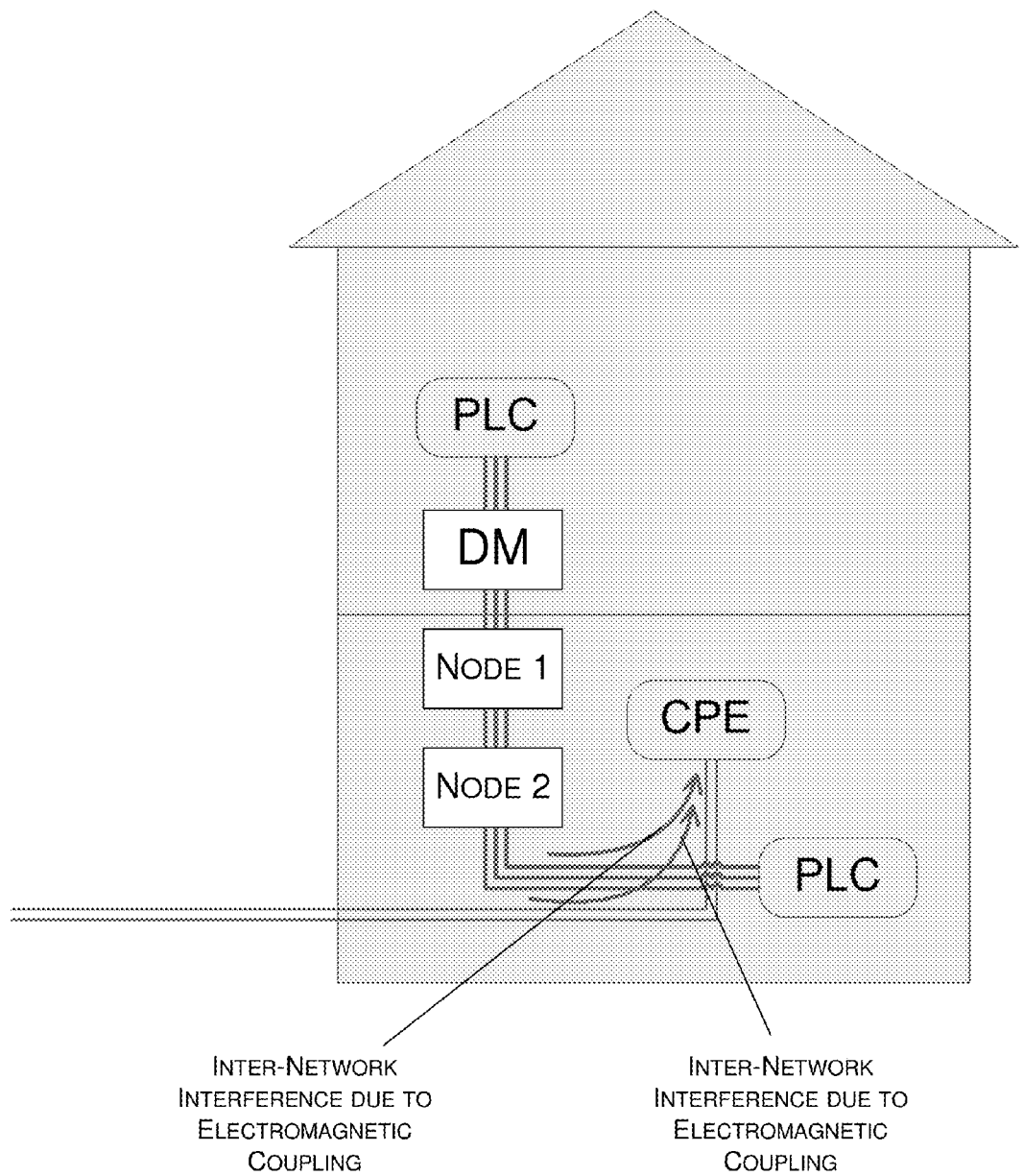
FIG. 1 is a diagram showing typical PLC-to-CPE interference.

Currently, it may be possible for the G.hn Recommendations to support a means for coexistence between networked devices that rely on frequency separation. Although this approach works, in most cases it may be suboptimal and significantly lower-than-desirable performance may result even in cases where there is minimal interference. Rather than using this simplistic approach, a sophisticated mechanism that measures the actual interference and takes the measurement into account while loading bits onto a signal transmission channel, instead of completely masking the sub-carriers to prevent interference, is needed in order to improve the performance while dealing with time-varying interference in more general interference scenarios.

Considering the interference from a given CPE to the PLC network, since PLC nodes rely on a very short channel estimation and adaptation time and have mechanisms such as strong forward error correction (FEC) and retransmission capability to operate in a variable-noise environment, the interference should not cause significant performance degradation in this direction, i.e., from the CPE to the PLC network. Furthermore, the wiring typically used for the CPE's physical layer connection is usually shielded to reduce the potential interference caused by the CPE on the powerline wiring in the vicinity.

However, the performance degradation in the reverse direction, i.e., from the PLC network to the CPE, tends to be more severe and thus requires mitigation techniques. For example, in the specific case of G.hn-based PLC node(s) and VDSL2 CPE operating near each other, interference that adversely affects the performance of the VDSL2 CPE may occur. G.hn uses half duplex communication and G.hn signal modulation uses a time-division multiplexing (TDM) frame-based transmission scheme and, as such, may not be activated (e.g., in the "ON" state) at all times. VDSL2 channel estimation (CE) is conducted at a fixed time during initialization. Channel estimation provides information regarding the signal transmission channel or medium. For example, channel estimation may provide information on how a signal propagates from a transmitter to a receiver as well as the combined effect of scattering, fading, and power decay with distance. Therefore, if nearby G.hn device(s) are not transmitting during the VDSL2 channel estimation, the VDSL2 signal-to-noise ratio (SNR) measurements and channel configuration based on those measurements may not accurately reflect the condition when the nearby G.hn device(s) transmit signals, resulting in errors on the CPE side when those nearby G.hn device(s) actually transmit. There are protocols, such as SRA, bitswap and SOS, in VDSL2 that allow online reconfiguration (OLR) but such reconfiguration is usually not instantaneous and there may be errors during the transition phase. Moreover, due to the time-varying nature of the interference injected by G.hn device(s), it may not even be possible to apply proper reconfiguration because the channel and noise conditions as seen by the VDSL2 device may keep changing depending on whether the G.hn device(s) is/are transmitting or not as well as the frequency and timing of those transmissions.

Figure 2:
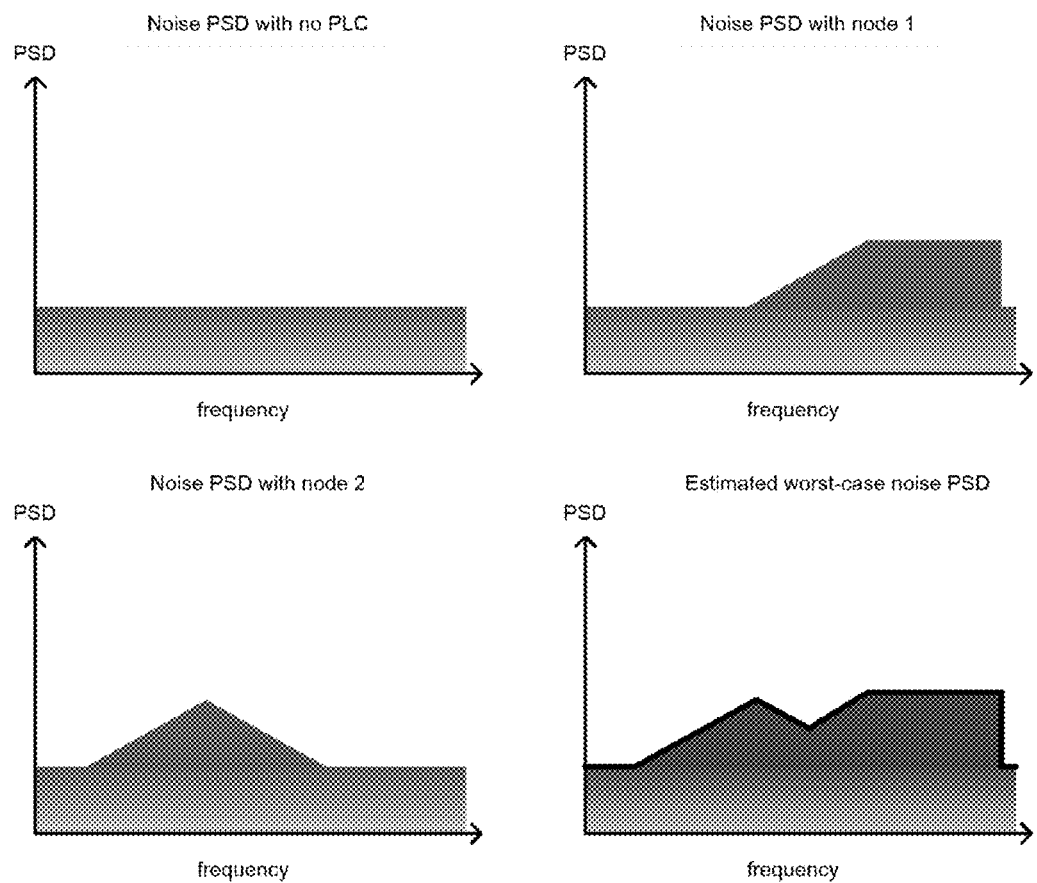
FIG. 2 is a diagram showing noise power spectral density (PSD) with no PLC, noise PSD with node 1, noise PSD with node 2 and estimated worst-case noise PSD at the CPE for interference suffered from two PLC nodes (node 1 and node 2) of FIG. 1.

On the other hand, if the PLC nodes are transmitting at a time when it is convenient for CPE device to measure the channel, such as during the CPE's channel estimation period or during a quiet period (for example, when quiet-line noise (QLN) measurements are made in VDSL2), it would allow the CPE device to adapt to the worst-case ON-state of the PLC network, so that regardless of the transmission state (ON or OFF) of the devices in the PLC network after this point the CPE device would be suitably adapted and thus could deal with the intermittent interference from the PLC nodes. FIG. 2 illustrates this concept. As shown in FIG. 2, if a CPE device uses the worst-case noise power spectral density (PSD) during channel estimation for loading bits, then the CPE connection will be stable and capable of delivering the traffic at the required quality of service (QoS) even if there is time-varying noise injection from PLC devices/nodes (i.e., noise PSD with node 1 and node 2 as shown in FIG. 2) in the vicinity. In the present disclosure the term "node" refers to a networked device on a network and, therefore, the terms "node" and "device" are used interchangeably.

In typical deployments a PLC network is connected to a CPE device acting as a gateway (for example, a logical connection at L2/L3 or physical connection) and it is therefore possible for the CPE device to communicate to the PLC network that it wishes to measure the channel, e.g., by sending a request message to the network domain master (referred to as the DM hereinafter) of the PLC network. The DM may respond to the request message by activating transmission over some or all PLC nodes for a pre-defined duration, or until the CPE device indicates that it has completed the measurement.

Example Scenarios

The present disclosure proposes the following stages in which the forced probe transmission (FPT) mode is entered by one or more PLC nodes for interference indication and mitigation based on the techniques described herein:

6. Stage 1: FPT during CPE channel estimation.
7. Stage 2: FPT during CPE quiet phase.
8. Stage 3: FPT during CPE initialization.
9. Stage 4: FPT during CPE showtime.
10. Stage 5: FPT when both local area network (LAN) and wide area network (WAN) networks are idle.

Stage 1: FPT During CPE Channel Estimation

First, a communication link (logical or physical) is established between the CPE device and one of the PLC nodes using the inter-device communication protocol described below. Prior to the CPE device's channel estimation phase the CPE device may send a request message to the DM of the PLC network (either directly or via a proxy node) for the PLC network to enter the FPT mode as described below. Within a specified duration the DM may respond to the request message with an acknowledgment indicating one of the following:

It has entered this mode;
It is unable to enter this mode; or
It does not support this mode.

If the DM fails to respond, the CPE device may assume that the PLC network has not entered the mode successfully and may send the request message again for a preset number of times. If there is still no response after the preset number of attempts, the CPE device may conclude that the PLC network does not support FPT mode.

Alternatively, in some embodiments, instead of requiring an explicit acknowledgement from the DM, the CPE device may be capable of detecting whether the DM has entered the FPT mode. The following text assumes an explicit acknowledgement from the DM, however it can be appreciated by those skilled in the art that the techniques described herein are still applicable for the case where the CPE device is capable of detecting the changes on the DM side without an explicit acknowledgement from the DM.

Upon receiving a positive acknowledgment from the DM of the PLC network, the CPE device may proceed to perform channel estimation, e.g., using vendor discretionary means, taking into account the operation of the PLC network in the FPT mode. An example of how a CPE device may use the FPT mode will be described later in the present disclosure.

After completing channel estimation or noise measurement while the PLC network is in the FPT mode, the CPE device may send an FPT mode termination request message to one or more PLC nodes of the PLC network. If a PLC node does not receive a termination message it may automatically terminate the mode after a specified duration.

Stage 2: FPT During CPE Quiet Phase

Prior to entering a quiet phase the CPE device may request the PLC node(s) to enter the FPT mode using the same protocol as described above. After a positive acknowledgment from the PLC node(s), the CPE device may start to measure the quiet-line noise, and analyze the line to estimate a worst-case noise profile from all the PLC nodes that are transmitting during the FPT phase. An example of how a CPE device may use the FPT transmission mode will be described later in the present disclosure. The worst-case noise profile may be saved as a virtual-noise profile which may then be used when the CPE device performs channel estimation during training and may also be used during showtime. This ensures that during showtime even if the PLC nodes are transmitting and receiving data during their normal operation, the CPE device maintains the SNR margin. The FPT mode may be terminated in a fashion similar to that described above with respect to stage 1.

Stage 3: FPT During CPE Initialization

The method in stage 3 is similar to the one described above regarding stage 2 with the exception that the PLC network is operating in FPT mode for the full duration of the CPE training phase. This mode simplifies the implementation at the CPE physical layer, thus allowing initiation and termination of the FPT mode during the entire duration of the CPE initialization and training. However, if the PLC network is actively used, it implies that the network may operate sub-optimally for a longer duration compared to the stages described above with respect to stage 1 and stage 2, in order to simplify the CPE implementation.

Stage 4: FPT During CPE Showtime

The method in stage 4 may be used to track and update the virtual noise measurements at the CPE device related to the interference from PLC nodes in the vicinity without impacting ongoing data traffic supported by the CPE device. The DM of the PLC network may inform the CPE device of any changes in the network topology, e.g., activation or deactivation of nodes, and the CPE device may react by requesting the PLC node(s) to operate in FPT mode for a sufficient amount of time to allow the CPE device to re-analyze the interference. Alternatively, in some embodiments, the CPE device may infer changes in the network topology in the PLC network and request the PLC node(s) to operate in FPT mode for a sufficient amount of time to allow the CPE device to re-analyze the interference. Detailed description is provided later in the present disclosure. The FPT mode may be terminated as described above regarding stage 1.

Stage 5: FPT when WAN and LAN Networks are Idle

This is a special diagnostic mode where both the CPE device and the PLC network are idle and without any data traffic. The PLC nodes may take turns to continuously transmit in a round-robin fashion while the CPE device records the noise profile as seen by the CPE device corresponding to the transmissions from each PLC node. In this case, since the CPE device is aware of the order of transmissions from the PLC nodes, the CPE device can estimate the noise profile corresponding to the interference from each of the PLC nodes. After all the PLC nodes have completed transmitting, the CPE device may repeat the process as needed and then derive a virtual noise mask, e.g., by taking the per-tone maximum of all individual noise profiles corresponding to the transmitting PLC nodes. This worst case virtual noise mask may then be taken into account during the CPE training and channel estimation (including bit-loading) phases to ensure that the CPE performance during showtime is not affected by interference from the normal operation of the PLC nodes operating in the vicinity.

CPE to PLC Communication Protocol

In order to facilitate and manage the various stages of the FPT mode it is necessary to establish a communication link and protocol between the CPE device and the DM of the PLC network. The implementation details may vary depending on the deployment topology of the CPE device and the PLC network, and can be classified into five categories outlined below. Once a communication link has been established, the CPE device and the DM may exchange messages via primitives as described below. The communication link between the CPE device and the DM may be direct or via one or more proxies as described below.

Although the following five categories of scenarios may typically apply to a network that belongs to one entity (e.g., a single family home or an apartment), some of the scenarios may also be applicable to cases of neighboring networks (e.g., neighbors in a multi-dwelling unit). For example, in example cases described below, the CPE device may be part of one network and the PLC nodes may be part of a network that belongs to a neighbor. The techniques described herein are still applicable in those cases.

CPE Entity to PLC Network Node Connection Scenarios

This section describes typical deployment scenarios for CPE device and PLC nodes and how a communication link can be established between the CPE device and one or more PLC nodes in each scenario. These scenarios are listed in a preferential order, meaning that if two or more scenarios from the following are applicable the scenario described first is most preferred.

6. CPE Entity and PLC Network Node Co-Located in a Single Device

In the scenario that the CPE device and a PLC node are co-located (e.g., implemented in the same physical device) the communication link between the co-located CPE and PLC nodes and the implementation of primitives may be vendor discretionary. If the DM of the PLC network is not the co-located CPE and PLC nodes, then the co-located CPE and PLC nodes may act as a proxy (the detail of which is described below).

7. CPE Entity and PLC Network Node on a LAN with IEEE 1905.1 Support

This scenario is applicable if at least one port (e.g., interface to a physical medium) in the CPE device supports the IEEE 1905.1 standard and at least one node of the PLC domain also supports IEEE 1905.1. In this scenario, a communications link that uses IEEE 1905.1 messages between the IEEE 1905.1 management entities in these devices may be established. For example, the messages exchanged between the CPE device and the DM of the PLC network may be embedded in the vendor specific IEEE 1905.1 protocol type/length/values (TLVs) that are exchanged between the CPE port supporting IEEE 1905.1 and the PLC node supporting IEEE 1905.1 (see section 6.2 and table 6-4 in IEEE 1905.1).

If the DM does not support IEEE 1905.1, then the PLC node supporting IEEE 1905.1 may act as a proxy (the detail of which is described below) for communication between the DM and the CPE device.

8. CPE Entity and PLC Network Node Managed by a Service Provider

This scenario is functionally similar to that described above (CPE entity and PLC network node co-located in a single device) with the difference that the communication between CPE device and PLC node is established over some part of the user's LAN. It is up to the service provider and vendors of the CPE device and PLC node to define this protocol. For example, the existing CPE WAN management protocols, such as TR-069 for example, may be used in conjunction with PLC management specifications, such as G.9962 for example, and corresponding data models for the devices may be extended for this purpose. If the DM is not remotely managed by the service provider, but just one of the PLC nodes is managed, then this PLC node may act as a proxy (the detail of which is described below) for communication between the DM and the CPE device.

9. All PLC Nodes Unmanaged or CPE Unmanaged and Automatically Discoverable

In this scenario, the assumption is that the CPE device is bridged to the same LAN as the network associated with the PLC nodes. However, the CPE device is not aware of the addresses of all PLC nodes including the DM of the PLC network. Therefore, a mechanism to discover the address of one or more of the PLC nodes is required in order to establish a communication link between the CPE device and the DM. The proposed mechanism and corresponding messages are as follows:

Send a network-wide broadcast message looking for a PLC node and requesting the address of the DM.

If a PLC node receives this broadcast message from the CPE device, the PLC node conveys it to its DM. The DM responds by sending a unicast reply message that includes the information about the number of nodes and their address information. This information may then be used by the CPE device to establish a communication link between the CPE device and the DM, which may possibly include a proxy between the CPE device and the DM.

10. CPE Entity and PLC Network Node Unmanaged with Manual Discovery

In this scenario, the assumption is that the CPE device is bridged to the same LAN as the network associated with the PLC nodes and the address of at least one network node of the PLC nodes is known to the user and may be programmed into the CPE device via user interface. The proposed mechanism and corresponding messages described below may then be used to establish a link between the CPE device and the DM.

Send a unicast message addressed to a PLC node the address of which is known by the CPE device, requesting the address of the DM.

Upon receiving this message from the CPE device, the PLC node conveys it to its DM. The DM responds by sending a unicast reply message that includes information about the number of nodes in the PLC network and their address information. This information may then be used by the CPE device to establish a communication link between the CPE device and the DM, which may possibly include a proxy between the CPE device and the DM.

CPE to DM Communication Via Proxy Node

In the scenarios described above, if the CPE device establishes a communication link with a PLC node that is not the DM of the PLC network, this intermediate node may act as a proxy in the communication between the CPE device and the DM. This requires an internal protocol within the PLC network to convey messages from the proxy to the DM and from the DM to the proxy. This mechanism is applicable to all the scenarios described above whenever a proxy is used to reach the DM from the CPE device or to reach the CPE device from the DM.

It is noteworthy that, although most of the content of the present disclosure refers to a proxy used between the DM and the CPE device, there may be two proxies used, one in each direction. For example, a first proxy may be used to reach the DM from the CPE device, and a second proxy may be used to reach the CPE device from the DM. The mechanisms and protocols for exchanging messages between the CPE device and DM are also applicable in case a different proxy is used in the DM to CPE device direction, compared to the CPE device to DM direction.

CPE to DM Message Primitives

Details of the actual messages that may be exchanged between a CPE device and the DM of a PLC network, once the communication link is established, are described hereinafter. Although a specific request is made by the CPE device in the following description, in some implementations more than one of the below-described requests may be included in a single message sent by the CPE device to the DM.

6. Get Network Information

The CPE device may send a message to the DM to request for the number of nodes in the PLC network and their identification. This may not be necessary if the FPT mode is requested on all the nodes.

7. Request FPT Mode

The CPE device may send a message to the DM to request one or more nodes in the PLC network to enter FPT mode during a specific time. This may include, for example, one node at a time or all the nodes or some sub-set thereof as desired by the CPE device. Example intermediate steps and message exchanges are as follows:

A FPT mode request message, requesting for FPT mode and indicating one or more nodes in the PLC network being requested to operate in FPT mode, is sent by the CPE device to the DM.

An acknowledgement to the request is sent by the DM to the CPE device. In a positive acknowledgement message the DM may indicate an approximate percentage of time of a given transmit opportunity (TXOP) during which the probe frame(s) would be transmitted by the requested node(s). This percentage may dynamically depend on the active data traffic in the PLC network at the time.

A termination request message is sent by the CPE device to the DM to request to terminate FPT mode.

8. Request PSD Information

The CPE device may send a message to the DM to request current PSD information from the DM. The requested information, to be provided by the DM, may include domain-wide limit PSD mask information and/or adjusted PSD mask for specific node(s) if the PSD mask thereof is adjusted, e.g., lowered, by the DM compared to the domain-wide limit PSD mask. The DM may respond to this message by providing the requested information.

9. Request PSD Reduction

The CPE device may send a message to the DM to request PSD reduction on one or more nodes, e.g., a specific set of nodes. The request may include desired amount of PSD reduction and specific frequency bands where this PSD reduction applies. Example intermediate steps and message exchanges are as follows:

A message indicating an amount of reduction and corresponding frequency bands, is sent by the CPE device to the DM.

An acknowledgement message indicating acceptance or denial of the request is sent by the DM. The acknowledgement message may simply indicate acceptance of the request. However, if the request is denied then the reason for denial may be indicated. In this case, the DM may also indicate the amount of PSD reduction that it may apply instead of agreeing to the amount proposed by the CPE device.

10. Topology Change

If the topology of the PLC network changes, e.g., due to addition or removal of nodes, then the DM of the PLC network may send an indication to the CPE device so that the CPE device may assess the impact on interference that the CPE device suffers due to the topology change, and take appropriate corrective action such as, for example, updating one or more SNR profiles, one or more noise measurements and/or one or more bit-loading tables of the CPE device. Alternatively, in some embodiments, the CPE device may infer the topology change of the PLC network without an explicit indication from the DM of the PLC network.

Forced Probe Transmission

Upon receiving a "Request FPT Mode" message (as described above), the DM may attempt a best effort to allocate all available resources that are currently not in use in the MAC cycle such that each node that is requested to be in FPT mode in the domain has an opportunity to transmit a probe frame during a predefined duration, e.g., a minimum duration, requested by the CPE device. For example, the CPE device may request the minimum duration to be 2 milliseconds in order to allow a sufficient number of OFDM symbols to be received by the CPE device for measurement. If there are resources, e.g., one or more TXOPs, available for additional probes the DM may allocate them. The DM may then send a message to the designated nodes requesting them to use all resources that are allocated to them to transmit probe frames if they do not have any other higher priority traffic. Alternatively, the DM may allocate one or more of the TXOPs for transmission of the probe frame, and indicate to the designated nodes via media access plan (MAP) that one or more of the TXOPs are specially allocated for transmissions in FPT mode, instead of explicitly sending the messages to those nodes. These probe frames are referred to as FPT probe frames and may be transmitted by the designated nodes at the maximum power level that the nodes can support within the limit PSD mask applied by the DM. In some embodiments, if the node has real data traffic for transmission, it may transmit that data in the allocated TXOPs for FPT and still meet the requirement of transmitting FPT from the perspective of the CPE device.

The total amount of time for all the designated nodes in the network to transmit at least a single FPT probe frame is kept to a minimum so that the CPE device can make an accurate estimation of the noise without adversely impacting the handling of the ongoing data traffic in the PLC network. For example, the DM may allocate specific TXOPs to specific nodes for transmitting FPT probe frames to ensure this is achieved. The DM may repeat this process until the CPE device requests the DM to terminate the FPT mode or until the specified time duration lapses. After the DM begins this process it may send an acknowledgment to the CPE device to indicate that the DM has begun the process, indicating how many nodes are participating and the amount of time, e.g., in milliseconds, required for a single cycle of FPT probe frame transmissions by all the designated nodes.

The DM may continually monitor the resources required for data traffic and adjust (increase or decrease) the resources allocated for the FPT transmissions accordingly. The DM may continue operating in the FPT mode for the specified duration or until it receives a termination request from the CPE device. After termination the DM may indicate to the nodes in the FPT mode on the PLC network to cease the FPT mode and return to normal operation.

Interference Estimation and Mitigation at CPE

On the CPE device, it may be beneficial to determine a virtual noise profile of the noise interference from the PLC network. This information may be used by the CPE device to maintain a safe, minimum SNR margin for bit-loading after showtime regardless of traffic activities on the PLC network.

During the FPT mode the CPE device may measure and record the worst-case interference PSD from the PLC network. Then, when the CPE device is computing the SNR margin for bit-loading, the CPE device may use the maximum of the received external noise PSD (for example, see Received_External_Noise_PSD in clause 11.4.1.1.6 of G.993.2) and the measured PLC interference to ensure that sufficient SNR margin is available even in the presence of transmissions in the PLC network. This may be done in conjunction with additional virtual noise modes currently specified in xDSL standards like G.993.2 and G.992.3 for different noise sources.

Interference Reduction by Lowering Transmit PSD of Interfering PLC Nodes

Once the CPE device estimates the interference PSD caused by specific PLC node(s) and the CPE device is aware of the transmit PSD of that/those node(s), the CPE device may communicate to the DM of the PLC network requesting PSD back-off for that/those node(s) in one or more specified frequency bands. The mechanism to apply per-node PSD mask indicated by the DM is already specified in G.hn standards. This mechanism, in conjunction with the request from the CPE device for reduction of transmission PSD by specific interfering nodes, may be used to reduce the interference suffered by the CPE device. The interference from specific PLC nodes may be reduced iteratively by applying FPT, estimating interference and requesting adjustment to the transmit PSDs without sacrificing the performance of the PLC nodes beyond what is necessary for acceptable performance of the CPE device.

Handling of Topology Changes in the PLC Network

After the adjustment of transmit PSDs of the interfering nodes and applying the virtual noise (as described above) for SNR margin computation during bit-loading, the CPE device may operate with sufficient SNR margin and deliver acceptable performance, even in the presence of intermittent transmissions from the interfering nodes. However, occasionally the topology of nodes in the PLC network may change as one or more devices are added to or removed from the PLC network. This necessitates a means for adapting the operation of the CPE device so that it can adjust to the changes in interference generated by the change in the topology of the PLC network.

As soon as the DM detects a change in the topology of the PLC network that may affect the interference suffered by the CPE device, the DM may convey this change of topology to the CPE device. Alternatively, in some embodiments, the CPE device may detect a change in the topology of the PLC network without an explicit indication from the DM. Depending on the information conveyed by the DM or discovered by its own detection, the CPE device may perform an interference estimation and mitigation procedure described above, re-compute the virtual noise, and re-adjust the transmit PSDs of the interfering nodes. The CPE device may then adapt to the new virtual noise by running the online reconfiguration procedure (e.g., bitswap or SRA) to maintain the required SNR margin if the changes in the topology of PLC nodes do not cause any significant change in the interference. If there is significant change in the interference, the CPE device may retrain.

Example Interference Measurement During FPT for CPE Devices

The CPE device may use the information contained in the acknowledgement for FPT mode request message to assist in interpreting the noise it measures on the line, or signal transmission channel, and to estimate the PLC noise PSD. During the time it takes for a single cycle of FPT, the CPE device may measure the per-tone maximum noise level over all symbols of the cycle which may then be averaged over multiple cycles to obtain an average noise threshold. The average noise threshold may be used by the CPE device to filter out any unusual peaks or impulses in signals received by the CPE device over the signal transmission channel. This may provide a conservative estimate of the PLC noise PSD which may be preferable considering the channel may be time varying.

If additional time is available for the CPE device, it may perform more accurate measurements and apply statistical analysis to establish a better estimate of the PLC noise PSD. Note that the techniques described herein do not require knowledge of specific time when a specific designated node transmits in the FPT mode, since these techniques are based on the statistical analysis of the interference measurements. Also, this allows the possibility of the nodes choosing to transmit data traffic instead of transmitting FPT frames whenever the nodes have data to transmit, without adversely affecting the interference measurements at the CPE device.

Example Communication Device

Figure 3:
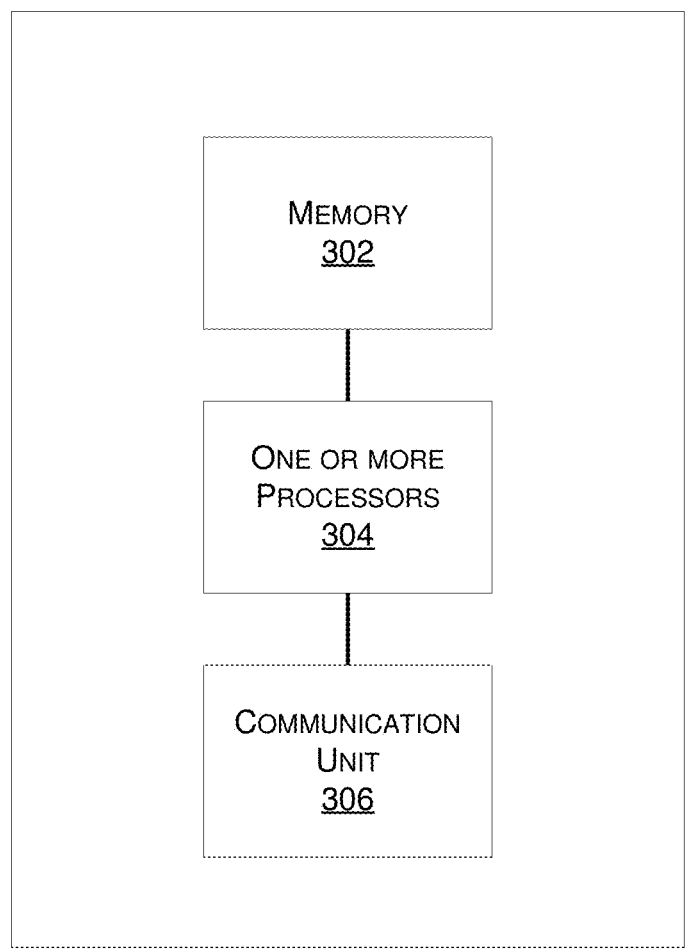
FIG. 3 is a block diagram of a communication device in accordance with an embodiment of the present disclosure.

FIG. 3 illustrates components of a communication device 300 that is capable of performing operations in accordance with the present disclosure, including executing the techniques, methods, mechanisms described herein and/or any variation thereof. Communication device 300 may be, for example, an integrated-circuit processor, a chipset, or an apparatus incorporating such processor or chipset. For instance, communication device 300 may be used as a CPE device configured to perform functions of a CPE device as described in the present disclosure. Additionally or alternatively, communication device 300 may be used as the DM of a PLC network to perform functions of a DM as described in the present disclosure.

As shown in FIG. 3, the communication device 300 comprises one or more logical blocks including a memory 302, one or more processors 304, and a communication unit 306. The memory 302 is configured to store one or more sets of instructions therein. The one or more processors 304 is/are configured to execute the one or more sets of instructions stored in the memory 302. The communication unit 306 is configured to transmit data (e.g., packets) and receive data under the command of the one or more processors 304. Upon executing the one or more sets of instructions stored in the memory 302, the one or more processors 304 may carry out one or more of the techniques, methods, mechanisms described herein and/or any variation thereof. For example, upon executing the one or more sets of instructions stored in the memory 302, the one or more processors 304 may enable communication device 300 to execute operations to perform some or all of the functions, techniques and tasks described in the present disclosure, including the execution of processes 400 and 500 described below.

Example Processes

Processes discussed herein are illustrated as a collection of referenced acts arranged in a logical flow graph represented as a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the operations or acts of a process are described is not intended to be construed as a limitation, and any number of the described acts can be combined in any order and/or in parallel to implement the process.

Figure 4:
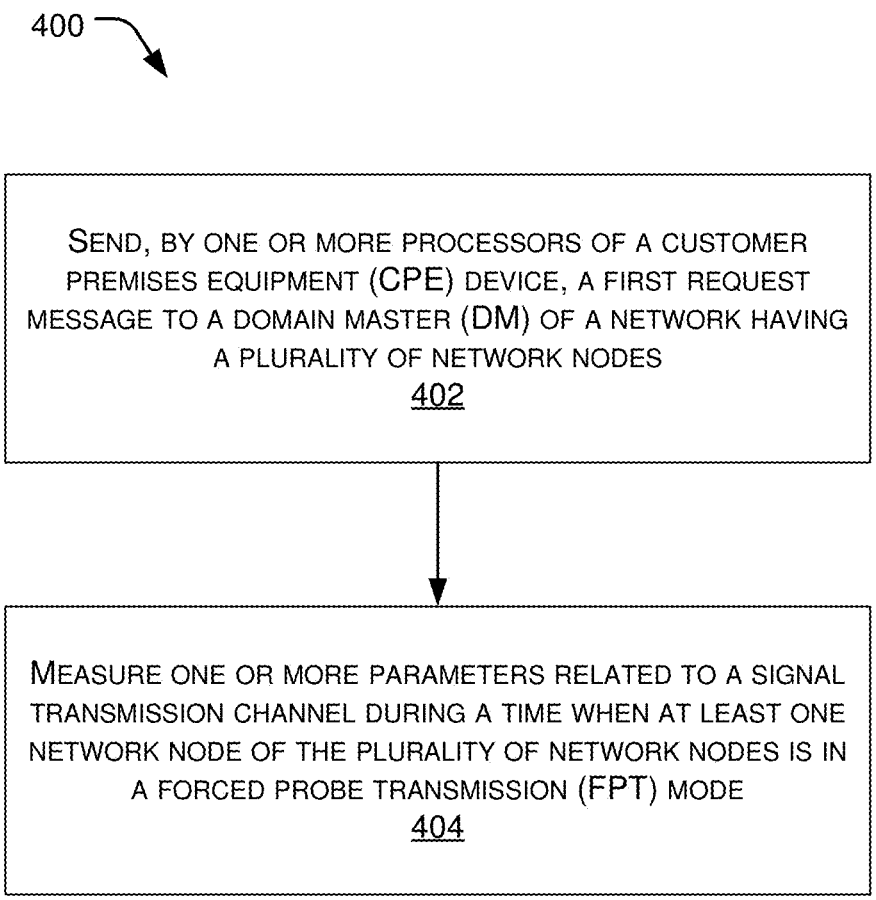
FIG. 4 is a flow diagram of an example process of mitigating adverse effects from inter-network interference in accordance with an embodiment of the present disclosure.

FIG. 4 illustrates a flow diagram of an example process 400 of mitigating adverse effects from inter-network interference in accordance with an embodiment of the present disclosure. Process 400 may be implemented by a communication device having one or more processors. Further, process 400 may include one or more operations, actions, or functions depicted by one or more blocks 402 and 404. For illustrative purpose, process 400 is described below as being performed by the one or more processors 304 of communication device 300 functioning as a CPE device. Process 400 may begin at 402.

At 402, the one or more processors 304 of communication device 300, functioning as a CPE device, send a first request message to a domain master (DM) of a network having a plurality of network nodes. The first request message may indicate at least one network node of the plurality of network nodes requested to enter a FPT mode. The first request message may also indicate a predefined duration during which the indicated at least one network node of the plurality of network nodes is requested to transmit a probe frame when in the FPT mode.

At 404, the one or more processors 304 measure one or more parameters related to a signal transmission channel during a time when the at least one network node of the plurality of network nodes is in the FPT mode.

In some embodiments, the network may include a powerline communication network.

In some embodiments, in measuring one or more parameters, the one or more processors 304 may measure noise on the signal transmission channel during channel estimation by the CPE device, during a quiet phase, during a training phase of the CPE device, during showtime, or when the network is idle.

In some embodiments, process 400 may also include the one or more processors 304 functioning as a proxy of the network when the CPE device and one of the plurality of network nodes are co-located and not acting as the DM.

In some embodiments, process 400 may also include the one or more processors 304 establishing a communication link with the at least one network node of the plurality of network nodes in accordance with an IEEE 1905.1 standard.

In some embodiments, process 400 may also include the one or more processors 304 performing operations prior to sending the first request message. The operations may include discovering one or more addresses associated with the plurality of network nodes and establishing a communication link between the CPE device and the DM. In some embodiments, in discovering, process 400 may include the one or more processors 304 sending a broadcast message or a unicast message to request an address of the DM, the unicast message being directed to one of the plurality of network nodes an address of which is known to the one or more processors. Additionally, in establishing the communication link between the CPE device and the DM, process 400 may include the one or more processors 304 establishing the communication link between the CPE device and the DM via one or more proxies.

In some embodiments, process 400 may also include the one or more processors 304 receiving an acknowledgement from the DM that indicates an approximate percentage of time of a transmit opportunity during which the probe frame is transmitted by the at least one network node of the plurality of network nodes.

In some embodiments, process 400 may also include the one or more processors 304 performing operations subsequent to sending the first request message. The operations may include sending a second request message to the DM. The second request message may indicate one or more of the following: a request for a number of network nodes in the network and identification thereof, a request for a domain-wide limit PSD mask or an adjusted PSD mask if applicable, or a request for PSD reduction on a select number of the plurality of network nodes.

In some embodiments, process 400 may also include the one or more processors 304 receiving an indication from the DM that there is a change in a topology of the network. Process 400 may further include the one or more processors 304 adjusting a SNR profile, a noise measurement, or a bit-loading table.

In some embodiments, process 400 may also include the one or more processors 304 receiving an indication from the DM indicating a number of network nodes of the network participating in transmission of probe frames and an amount of time required for a single cycle of probe frame transmissions by the number of network nodes of the network participating in the transmission of the probe frames.

In some embodiments, process 400 may also include the one or more processors 304 determining a noise profile of noise interference from the network. Process 400 may further include the one or more processors 304 maintaining a SNR margin for bit-loading regardless of traffic activities on the network.

In some embodiments, process 400 may also include the one or more processors 304 estimating an interference PSD caused by one or more network nodes of the plurality of network nodes. Process 400 may further include the one or more processors 304 sending a third request message to the DM to request PSD back-off for the one or more network nodes in one or more frequency bands.

In some embodiments, process 400 may also include the one or more processors 304 measuring a noise level on the signal transmission channel during the FPT mode. Process 400 may also include the one or more processors 304 determining an average noise threshold based at least in part on the measured noise level. Process 400 may further include the one or more processors 304 filtering out one or more peaks or impulses in signals received by the CPE device over the signal transmission channel.

Figure 5:
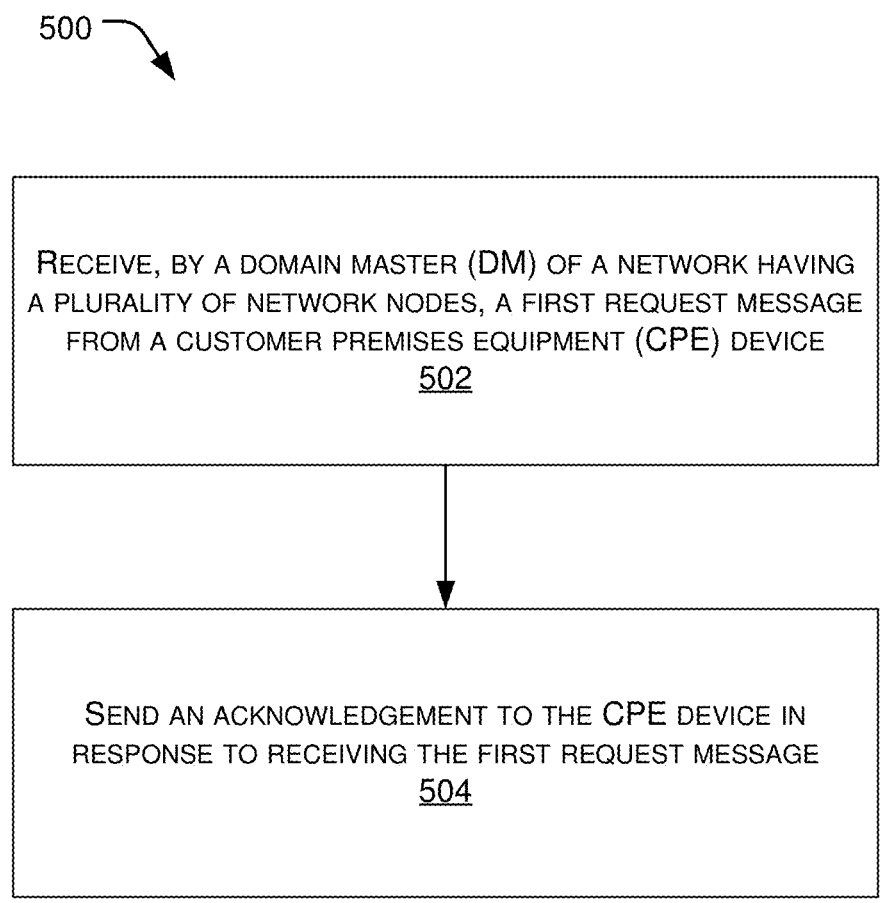
FIG. 5 is a flow diagram of an example process of mitigating adverse effects from inter-network interference in accordance with another embodiment of the present disclosure.

FIG. 5 illustrates a flow diagram of an example process 500 of mitigating adverse effects from inter-network interference in accordance with an embodiment of the present disclosure. Process 500 may be implemented by a communication device having one or more processors. Further, process 500 may include one or more operations, actions, or functions depicted by one or more blocks 502 and 504. For illustrative purpose, process 500 is described below as being performed by the one or more processors 304 of communication device 300 functioning as a DM of a network. Process 500 may begin at 502.

At 502, the one or more processors 304 of communication device 300, functioning as a DM of a network having a plurality of network nodes, receive a first request message from a CPE device. The first request message may indicate at least one network node of the plurality of network nodes requested to enter a FPT mode. The first request message may also indicate a predefined duration during which the indicated at least one network node of the plurality of network nodes is requested to transmit a probe frame when in the FPT mode At 502, the one or more processors 304 send an acknowledgement to the CPE device in response to receiving the first request message.

In some embodiments, the network may include a powerline communication network.

In some embodiments, the acknowledgement may indicate an approximate percentage of time of a transmit opportunity during which the probe frame is transmitted by the at least one network node of the plurality of network nodes.

In some embodiments, process 500 may also include the one or more processors 304 performing operations in response to receiving the first request message. The operations may include allocating one or more TXOPs during the FPT mode and sending an indication to the at least one network node that the one or more TXOPs are allocated for transmission of the probe frame in the FPT mode.

In some embodiments, process 500 may also include the one or more processors 304 performing operations subsequent to receiving the first request message. The operations may include receiving a second request message from the CPE device. The second request message may indicate one or more of the following: a request for a number of network nodes in the network and identification thereof, a request for a domain-wide limit PSD mask or an adjusted PSD mask if applicable, or a request for PSD reduction on a select number of the plurality of network nodes.

In some embodiments, process 500 may also include the one or more processors 304 detecting a change in a topology of the network. Process 500 may further include the one or more processors 304 sending an indication to the CPE device that there is the change in the topology of the network.

In some embodiments, process 500 may also include the one or more processors 304 sending an indication to the CPE device indicating a number of network nodes of the network participating in transmission of probe frames and an amount of time required for a single cycle of probe frame transmissions by the number of network nodes of the network participating in the transmission of the probe frames.

In some embodiments, process 500 may also include the one or more processors 304 receiving a third request message from the CPE device requesting for address information. Process 500 may further include the one or more processors 304 sending a reply message by unicast to the CPE device in response to receiving the third request message, the reply message indicating a number of network nodes in the network and information related to addresses of the plurality of network nodes of the network.

In view of the above, a communication system according to the present disclosure may include a first transceiver system implementing a first technology and a second transceiver system implementing a second technology. The first technology, as an interfering technology, may cause interference on the second technology, as a victim technology, such that the interfering technology has a transmission mode that allows the victim technology to adapt to the interference.

In at least some embodiments, the interfering technology may be a time-division multiplexing access technology.

In at least some embodiments, the interfering technology may be a PLC technology.

In at least some embodiments, the interfering technology may be implemented on a network of one or more nodes.

In at least some embodiments, the network may include at least one device that supports one or more of the G.hn Recommendations including G.9960/G.9961/G.9962/G.9963/G.9964.

In at least some embodiments, the network may include at least one device that supports one or more of the HomePlug standards, including HomePlug 1.0, HomePlug AV, HomePlug AV2, HomePlug Green PHY, and HomePlug Access BPL.

In at least some embodiments, the network may include at least one device that supports IEEE 1901.

In at least some embodiments, the network may include a master node that manages the network.

In at least some embodiments, the victim technology may be a frequency division multiplexing (FDM) or time division duplexing (TDD) technology.

In at least some embodiments, the victim technology may be implemented on a CPE device.

In at least some embodiments, the CPE device may follow the g.993.2 standard for VDSL2.

In at least some embodiments, the CPE device may operate in accordance with the g.fast standard.

In at least some embodiments, the CPE device and a master node that manages the network may communicate over one or more mediums.

In at least some embodiments, the CPE device and the master node, or a proxy of the master node, may communicate based on IEEE 1905.1.

In at least some embodiments, the master node may allocate media access resources of the network by communicating with the two or more nodes of the network.

In at least some embodiments, the master nodes may allocate media access resources using a media access plan (MAP) frame.

In at least some embodiments, the master node may be configured to operate in the transmission mode to distribute access resources so that each of at least some of the two or more nodes of the network has an opportunity to transmit.

In at least some embodiments, the master node may be configured to send a request message to at least some of the two or more nodes of the network to enter into the transmission mode such that a first node of the at least some of the two or more nodes use a media resource that the first node is allocated to transmit a particular type of frame when the first node does not have another obligation of a higher priority.

In at least some embodiments, the first node may be configured to transmit probe frames responsive to receiving the request message.

In at least some embodiments, a CPE device may be configured to communicate to the master node to indicate that the master node should invoke the transmission mode for a limited duration.

In at least some embodiments, the master may initiate the transmission mode responsive to receiving the communication from the CPE device.

In at least some embodiments, the CPE device, after communicating to the master node, may measure an interference from interfering technology during a period that the master node is operating in the transmission mode.

In at least some embodiments, the CPE device may obtain information obtained about the interference during the period and performs adaptation to mitigate effects of the interference.

In at least some embodiments, the CPE device may measure a noise power spectrum density (PSD) curve of the interference.

In at least some embodiments, the CPE device may use the noise PSD to generate a virtual noise mask to be used in accordance with g.993.2.

Additional Notes

Embodiments of powerline interference indication and mitigation for DSL transceivers in accordance with the present disclosure are not limited to those described herein. The actual design and implementation of the network in accordance with the present disclosure may vary from the embodiments described herein. Those ordinarily skilled in the art may make various deviations and improvements based on the disclosed embodiments, and such deviations and improvements are still within the scope of the present disclosure. Accordingly, the scope of protection of a patent issued from the present disclosure is determined by the claims as follows.

In the above description of exemplary implementations, for purposes of explanation, specific numbers, materials configurations, and other details are set forth in order to better explain the present disclosure, as claimed. However, it will be apparent to one skilled in the art that the claimed subject matter may be practiced using different details than the exemplary ones described herein. In other instances, well-known features are omitted or simplified to clarify the description of the exemplary implementations.

What is claimed is:

1. A method, comprising:
    sending, by one or more processors of a customer premises equipment (CPE) device, a first request message to a node of a network comprising a plurality of network nodes, the first request message indicating at least one network node of the plurality of network nodes requested to enter a in which the at least one network node is forced to transmit on a first medium; and
    measuring one or more parameters related to a second medium that is used for transmissions by the CPE device during a time when the at least one network node of the plurality of network nodes is forced to transmit on the first medium.

2. The method of claim 1, wherein the network comprises a powerline communication network.

3. The method of claim 2, wherein the powerline communication network comprises at least one device that supports one or more of HomePlug standards, including HomePlug 1.0, HomePlug AV, HomePlug AV2, HomePlug Green PHY, and HomePlug Access BPL.

4. The method of claim 2, wherein the powerline communication network comprises at least one device that supports one or more of G.hn Recommendations including G.9960/G.9961/G.9962/G.9963/G.9964.

5. The method of claim 1, wherein the measuring one or more parameters comprises measuring noise on the second medium during one or more of the following: channel estimation by the CPE device, during a quiet phase, during a training phase of the CPE device, during showtime, and when the network is idle.

6. The method of claim 1, further comprising:
functioning as a proxy of the network when the CPE device and one of the plurality of network nodes are co-located and not acting as a domain master (DM).

7. The method of claim 1, further comprising:
establishing a communication link in accordance with an IEEE 1905.1 standard with the node of the network comprising the plurality of network nodes.

8. The method of claim 1, further comprising:
prior to the sending:
discovering one or more addresses associated with the plurality of network nodes; and
establishing a communication link between the CPE device and the node of the network comprising the plurality of network nodes.

9. The method of claim 8, wherein the discovering comprises sending a broadcast message or a unicast message to request an address of a domain master (DM), the unicast message being directed to one of the plurality of network nodes an address of which is known to the one or more processors.

10. The method of claim 8, wherein the establishing a communication link between the CPE device and the node of the network comprising the plurality of network nodes comprises establishing the communication link between the CPE device and the node of the network via one or more proxies.

11. The method of claim 1, further comprising:
receiving an acknowledgement from the node of the network comprising the plurality of network nodes that indicates an approximate percentage of time during which the probe frame is transmitted by the at least one network node of the plurality of network nodes.

12. The method of claim 1, further comprising:
sending a second request message to the node of the network comprising the plurality of network nodes, the second request message indicating one or more of the following:
a request for a number of network nodes in the network and identification thereof;
a request for a domain-wide limit power spectral density (PSD) mask or an adjusted PSD mask if applicable; or
a request for PSD reduction on a select number of the plurality of network nodes.

13. The method of claim 1, further comprising:
receiving an indication from a node of the network comprising the plurality of network nodes that there is a change in a topology of the network; and
adjusting a signal-to-noise ratio (SNR) profile, a noise measurement, or a bit-loading table.

14. The method of claim 1, further comprising:
receiving an indication from a node of the network comprising the plurality of network nodes indicating a number of network nodes of the network participating in transmission of probe frames and an amount of time required for a single cycle of probe frame transmissions by the number of network nodes of the network participating in the transmission of the probe frames.

15. The method of claim 1, further comprising:
determining a noise profile of noise interference from the network; and
maintaining a signal-to-noise ratio (SNR) margin for bit-loading regardless of traffic activities on the network.

16. The method of claim 1, further comprising:
estimating an interference power spectral density (PSD) caused by one or more network nodes of the plurality of network nodes; and
sending a third request message to the node of the network comprising the plurality of network nodes to request PSD back-off for the one or more network nodes in one or more frequency bands.

17. The method of claim 1, further comprising:
measuring a noise level on the second medium during the mode in which the at least one network node of the plurality of network nodes is forced to transmit on the first medium;
determining an average noise threshold based at least in part on the measured noise level; and
optionally filtering out one or more peaks or impulses in signals received by the CPE device over the second medium.

18. The method of claim 1, wherein the first request message also indicates a predefined duration during which the at least one network node of the plurality of network nodes is requested to enter a mode in which the at least one network node is forced to transmit on the first medium.

19. The method of claim 1, wherein the mode in which the at least one network node of the plurality of network nodes is forced to transmit on the first medium comprises a forced probe transmission (FPT) mode.

20. The method of claim 1, wherein the node of the network to which the first request message is sent comprises a domain master (DM) of the network.

21. The method of claim 1, wherein the first medium comprises a powerline medium, and wherein the second medium comprises a medium for Ethernet, cable or digital subscriber line (DSL) communication.

22. A method, comprising:
receiving, by a node of a network comprising a plurality of network nodes operating on a first medium, a first request message from a customer premises equipment (CPE) device operating on a second medium, the first request message indicating at least one network node of the plurality of network nodes requested to enter a mode in which the at least one network node is forced to transmit on the first medium.

23. The method of claim 22, wherein the network comprises a powerline communication network.

24. The method of claim 23, wherein the powerline communication network comprises at least one device that supports one or more of HomePlug standards, including HomePlug 1.0, HomePlug AV, HomePlug AV2, HomePlug Green PHY, and HomePlug Access BPL.

25. The method of claim 23, wherein the powerline communication network comprises at least one device that supports one or more of G.hn Recommendations including G.9960/G.9961/G.9962/G.9963/G.9964.

26. The method of claim 22, wherein the acknowledgement indicates an approximate percentage of time during which the probe frame is transmitted by the at least one network node of the plurality of network nodes.

27. The method of claim 22, further comprising:
receiving a second request message from the CPE device, the second request message indicating one or more of the following:
- a request for a number of network nodes in the network and identification thereof;
- a request for a domain-wide limit power spectral density (PSD) mask or an adjusted PSD mask if applicable; or
- a request for PSD reduction on a select number of the plurality of network nodes.

28. The method of claim 22, further comprising:
detecting a change in a topology of the network; and
sending an indication to the CPE device that there is the change in the topology of the network.

29. The method of claim 22, further comprising:
sending an indication to the CPE device indicating a number of network nodes of the network participating in transmission of probe frames and an amount of time required for a single cycle of probe frame transmissions by the number of network nodes of the network participating in the transmission of the probe frames.

30. The method of claim 22, further comprising:
receiving a third request message from the CPE device requesting for address information; and
sending a reply message by unicast to the CPE device in response to receiving the third request message, the reply message indicating a number of network nodes in the network and information related to addresses of the plurality of network nodes of the network.

31. The method of claim 22, further comprising:
sending an acknowledgement to the CPE device in response to receiving the first request message.

32. The method of claim 22, further comprising:
complying with the first request message.

33. The method of claim 22, wherein the first request message also indicates a predefined duration during which the at least one network node of the plurality of network nodes is requested to enter a mode in which the at least one network node is forced to transmit on the first medium.

34. The method of claim 22, wherein the mode in which the at least one network node of the plurality of network nodes is forced to transmit on the first medium comprises a forced probe transmission (FPT) mode.

35. The method of claim 34, further comprising:
in response to receiving the first request message:
- allocating one or more transmit opportunities (TXOPs) during the FPT mode; and
- sending an indication to the at least one network node that the one or more transmit opportunities (TXOPs) are allocated for transmission of the probe frame in the FPT mode.

36. The method of claim 22, wherein the first medium comprises a powerline medium, and wherein the second medium comprises a medium for Ethernet, cable or digital subscriber line (DSL) communication.

* * * * *